(12) United States Patent
Hatemata

(10) Patent No.: US 7,225,273 B2
(45) Date of Patent: *May 29, 2007

(54) INTERFACE APPARATUS PROVIDED BETWEEN TWO REMOTE CONTROL SYSTEMS HAVING DIFFERENT TRANSMISSION MODES

(75) Inventor: Takeshi Hatemata, Neyagawa (JP)

(73) Assignee: Matsushita Electronic Works, Ltd., Kadoma-shi (JP)

( * ) Notice: Subject to any disclaimer, the term of this patent is extended or adjusted under 35 U.S.C. 154(b) by 634 days.

This patent is subject to a terminal disclaimer.

(21) Appl. No.: 10/096,281

(22) Filed: Mar. 13, 2002

(65) Prior Publication Data

US 2002/0143887 A1 Oct. 3, 2002

(30) Foreign Application Priority Data

Mar. 27, 2001 (JP) .......................... P2001-091287

(51) Int. Cl.
*G06F 15/16* (2006.01)

(52) U.S. Cl. ...................... 709/249; 700/9; 340/825.2; 340/825.1

(58) Field of Classification Search ................ 709/250, 709/249; 700/9; 340/825.2, 825.1
See application file for complete search history.

(56) References Cited

U.S. PATENT DOCUMENTS 5,144,295 A * 9/1992 Nakagawa et al. ......... 370/282
5,307,058 A * 4/1994 Tokizane et al. ........... 340/3.21
5,530,434 A * 6/1996 Kanda ......................... 340/2.2
5,598,566 A * 1/1997 Pascucci et al. ............ 713/324
6,188,686 B1 * 2/2001 Smith ......................... 370/388
6,459,938 B1 * 10/2002 Ito et al. ........................ 700/9
6,754,185 B1 * 6/2004 Banerjee et al. ............ 370/282

OTHER PUBLICATIONS

S. Hironaka, Transistor Gijutsu, pp. 367-384, "Distributed Control Network—Technique of Lonworks, First Round, Outline and Protocol of Lonworks", Aug. 1997 (with partial English translation).

\* cited by examiner

*Primary Examiner*—William Vaughn
*Assistant Examiner*—Greg Bengzon
(74) *Attorney, Agent, or Firm*—Oblon, Spivak, McClelland, Maier & Neustadt, P.C.

(57) ABSTRACT

In an interface apparatus provided between a first remote control system of polling communication system and a second remote control system of contention communication system, a control section executes at least one processing of the following processings based on mapping information of addresses. A first control processing is to transmit a transmission signal for controlling a second load unit to a second node unit responsive to a transmission signal which represents reception of a first input signal and is transmitted from a first terminal unit, thereby controlling the second load unit based on the first input signal. A second control processing is to transmit a transmission signal for controlling a first load unit to the first load unit responsive to a transmission signal which represents reception of the second input signal and is transmitted from the second node unit, thereby controlling the first load unit based on the second input signal.

7 Claims, 12 Drawing Sheets

INTERFACE APPARATUS PROVIDED BETWEEN TWO REMOTE CONTROL SYSTEMS HAVING DIFFERENT TRANSMISSION MODES

BACKGROUND OF THE INVENTION

1. Field of the Invention

The present invention relates to an interface apparatus between two remote control systems having transmission modes different from each other, and in particular, an interface apparatus between a first remote control system of polling communication system and a second remote control system of convention system.

2. Description of the Related Art

Conventionally, there has been proposed a remote control system of polling system (hereinafter referred to as a "polling communication system") in which a plurality of terminal units and one transmission unit are connected with each other via a signal line, and the transmission unit performs data exchange or data of transmission and receipt between the terminal units by accessing respective terminal units by using respective addresses allocated to respective terminal units by the time division multiplexing access. In such a remote control system, in order to control an action of a load in response to a switch operation, there is provided a pair of terminal units, in which one terminal unit receives binary data inputted by a switch operation (by monitoring the switch operation), and another terminal unit controls the load such as an illumination load. The transmission unit has such mapping information that the address of the terminal unit on the switch side is mapped to or corresponds to the address of terminal unit on the load side. Consequently, when the transmission units detects an operation of the terminal unit on the switch side, the transmission unit notifies the terminal unit on the load side of the switch operation. On the other hand, the terminal unit on the load side transmits information as to the action or operating of the load to the terminal unit on the switch side via the transmission unit. This leads to that the operating state of the load can be displayed on a displaying light which is provided in the terminal unit on the switch side.

Also, there has been diffused a remote control system of convention system (hereinafter referred to as a "contention communication system") including a plurality of terminal units, in which each terminal unit includes a microcomputer for communication, the respective terminal units operate independently and separately, and the terminal units directly communicate with each other without any transmission unit. In such a remote control system, direct communication is established between a terminal unit for monitoring a switch operation and another terminal unit for controlling a load.

In the above-mentioned remote control systems, the polling communication system is currently applied mainly for controlling illumination loads, whereas the contention communication system is currently applied mainly for controlling air conditioning apparatuses. Accordingly, in the polling communication system, the terminal units have been manufactured as products with various functions for controlling illumination loads, whereas the contention communication system is expected high reliability in the field of air conditioning control.

By the way, if it is attempted to connect the polling communication system with the contention communication system, an interface apparatus is required. Some polling communication systems have a function to provide dimming control of an illumination load. Basically, however, the polling communication system controls ON/OFF operation of the illumination load. Therefore, the interface apparatus is only required to transmit the ON/OFF information between respective systems. Namely, in a system for sending the information, a contact point is turned ON/OFF through the terminal unit. On the other hand, in a system for receiving the information, the ON/OFF state of the contact point is monitored by the terminal unit. In other words, in the respective systems, there are required two terminal units includes (a) one terminal unit for transmitting information of contact output for control to a counterpart system, and (b) another terminal unit for receiving information of contact output from the counterpart system. In order to achieve bi-directional data exchange, each system requires two units and therefore total 4 terminal units are required. Normally, two terminal units are required for transmitting information from one system to another system, and additional two terminal units are required for receiving acknowledgement of operation from another system. Thus, the information exchange between systems additionally requires four terminal units.

As described above, four terminal units are required for controlling one load of a switch of one system in response to an operation of a switch in another system. With increase in the number of combinations of switches and loads, the number of terminal units remarkably increases. As a result, there will occur such a problem that the connection relationship becomes complicated.

SUMMARY OF THE INVENTION

An essential object of the present invention is therefore to provide an inter-system interface apparatus between a polling communication system and a contention communication system, capable of controlling and monitoring a load of a counterpart system.

Another object of the present invention is to provide an inter-system interface apparatus between a polling communication system and a contention communication system, capable of controlling and monitoring a load of a counterpart system by setting simple connection relationship even though the number of combinations of inputs and loads increases.

In order to achieve the aforementioned objective, according to one aspect of the present invention, there is provided an interface apparatus provided between a first remote control system of polling communication system and a second remote control system of contention communication system. The first remote control system includes a plurality of terminal units each having a predetermined address, and a transmission unit. The plurality of terminal units and the transmission unit are connected with each other via a first signal line. The transmission unit transmits and receives a transmission signal addressing a first terminal unit and a second terminal unit, respectively, to and from the first terminal unit for receiving a first input signal and to and from the second terminal unit for controlling a first load unit, via the first signal line, by using time division multiplexing access, thereby controlling the first load unit in response to the first input signal.

The second remote control system includes a plurality of node units each having a predetermined address, and the node units are connected via a second signal line. A first node unit for receiving a second input signal and a second node unit for controlling a second load unit transmit and receive a transmission signal addressing the first and second node units to and from each other via the second signal line, thereby controlling the second load unit in response to the second input signal.

The interface apparatus includes first and second signal processing sections, an address storage section, a state storage section, an information storage section, and a control section. The first signal processing section transmits and receives a transmission signal transmitting via the first signal line, and the second signal processing section transmits and receives a transmission signal transmitting via the second signal line. The address storage section is for use in the first signal processing section, and stores a plurality of equivalent addresses corresponding to respective addresses of the plurality of terminal units. The state storage section is for use in the second signal processing section, and stores respective addresses of the plurality of node units. The information storage section stores mapping information for mapping the respective equivalent addresses stored in the address storage section to the addresses stored in the state storage section.

The control section executes at least one processing of the following first and second processings based on the mapping information. The first control processing is to transmit a transmission signal for controlling the second load unit to the second node unit via the second signal line in response to a transmission signal which represents reception of the first input signal and which is transmitted from the first terminal unit via the first signal line, thereby controlling the first and second signal processing sections so as to control the second load unit based on the first input signal. The second control processing is to transmit a transmission signal for controlling the first load unit to the first load unit via the first signal line in response to a transmission signal which represents reception of the second input signal and which is transmitted from the first node unit via the second signal line, thereby controlling the first and second signal processing sections so as to control the first load unit based on the second input signal.

In the above-mentioned interface apparatus, the control section preferably executes both of the first and second control processings. Alternatively, the control section preferably executes only the first or second control processing.

In the above-mentioned interface apparatus, the state storage section preferably stores respective addresses of the plurality of node units, and names of the node units corresponding to the respective addresses.

In the above-mentioned interface apparatus, the information storage section preferably stores mapping information for mapping the respective equivalent addresses stored in the address storage section to the addresses stored in the state storage section, in one to one correspondence. Alternatively, the information storage section preferably stores mapping information for mapping the respective equivalent addresses stored in the address storage section to the addresses stored in the state storage section, in one to plural N correspondence.

In the above-mentioned interface apparatus, the control section preferably further includes a first switch for setting a plurality of N data in the mapping information.

In the above-mentioned interface apparatus, the control section preferably further includes a second switch for selecting one logical operation from OR, AND, NOR, and NAND logical operations to be performed for a plurality of N transmission signals which represent results of operating states of the plurality of N second load units to be controlled and which are received by the second signal processing section. The control section controls the first signal processing section so as to perform the logical operation selected by the second switch for the plurality of N transmission signals which represents results of operating states of the plurality of N second load units to be controlled and which is received by the second signal processing section, and to transmit a transmission signal representing the results of the logical operation to the first terminal unit mapped to the plurality of N second load units.

According to the present invention, the interface apparatus allows mapping of one input to another load unit or makes correspondence between the first remote control system and the second remote control system. In addition to this, the interface apparatus can function equivalently as a plurality of terminal units for the first remote control system, and can function equivalently as a plurality of node units for the second remote control system. This leads to controlling a plurality of load units in response to a plurality of inputs by connecting the terminal units to the first signal line, connecting the node units to the second signal line, and setting simple connection relationship.

When the control section executes only one processing out of the above-mentioned two processings, the interface apparatus provides only one function, and it is make the whole system easily.

When the state storage section stores not only respective addresses of a plurality of node units, but also the names of the node units corresponding to the respective addresses, then the names of the node units can be set, and the correspondence relationship between the node units and the terminal units can be easily understood.

When the information storage section stores mapping information for mapping the respective equivalent addresses stored in the address storage section to the addresses stored in the state storage section, in one to one correspondence. This leads to that the correspondence relationship between the node units and the terminal units can be easily understood, and the load units can be easily controlled.

When the information storage section stores mapping information for mapping the respective equivalent addresses stored in the address storage section to the addresses stored in the state storage section, in one to plural N correspondence. This leads to that a plurality of node units of the second remote control system can be easily batch-controlled by one terminal unit of the first remote control system.

When the control section further includes the first switch for setting a plurality of N data in the mapping information. This leads to that a plurality of node units of the second remote control system can be easily batch-controlled by one terminal unit of the first remote control system, in one to plural N correspondence.

When the control section further includes the second switch for selecting one logical operation from OR, AND, NOR, and NAND logical operations to be performed for a plurality of N transmission signals which represent results of operating states of a plurality of N second load units to be controlled and which are received by the second signal processing section, and the control section performs the logical operation selected by the second switch for a plurality of N transmission signals which represents results of operating states of a plurality of N second load units to be controlled and which is received by the second signal processing section, and transmits a transmission signal representing the results of the logical operation to the first terminal unit mapped to the plurality of N second load units.

This allows collective management of predetermined operating states of a plurality of second load units in the first remote control system, and it is possible to monitor checking any second load units which the user has forgot to turn off, and to monitor an abnormal state of the second load units. Providing the second switch for batch-control over the second load units corresponding to this kind of monitoring results allows such a control as collectively turning off the second load units when the user has forgot to turn off the second load units.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings.

First Preferred Embodiment

Figure 1:
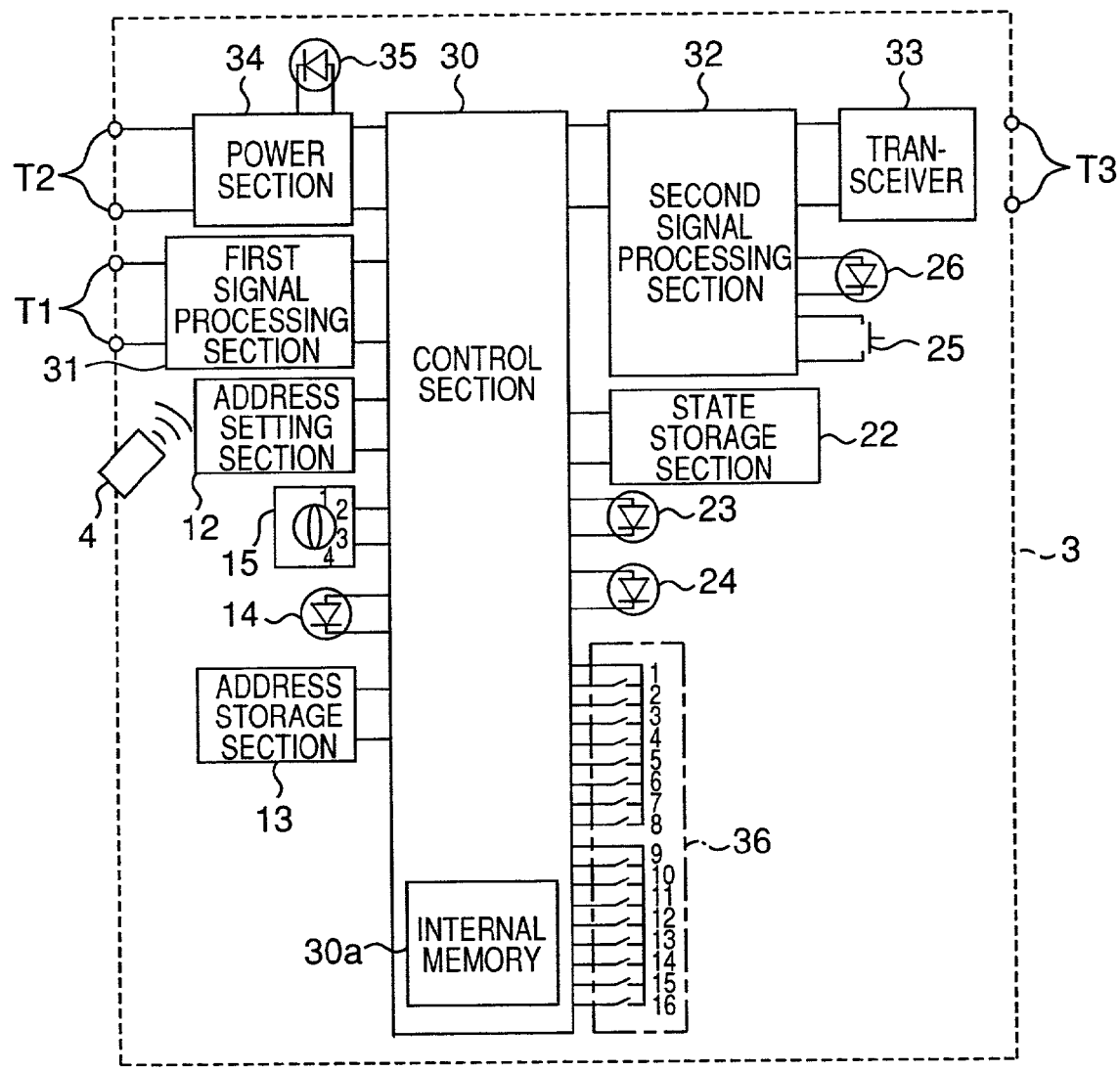
FIG. 1 is a block diagram showing a structure of an inter-system interface apparatus 3 according to a first preferred embodiment of the present invention.
Figure 2:
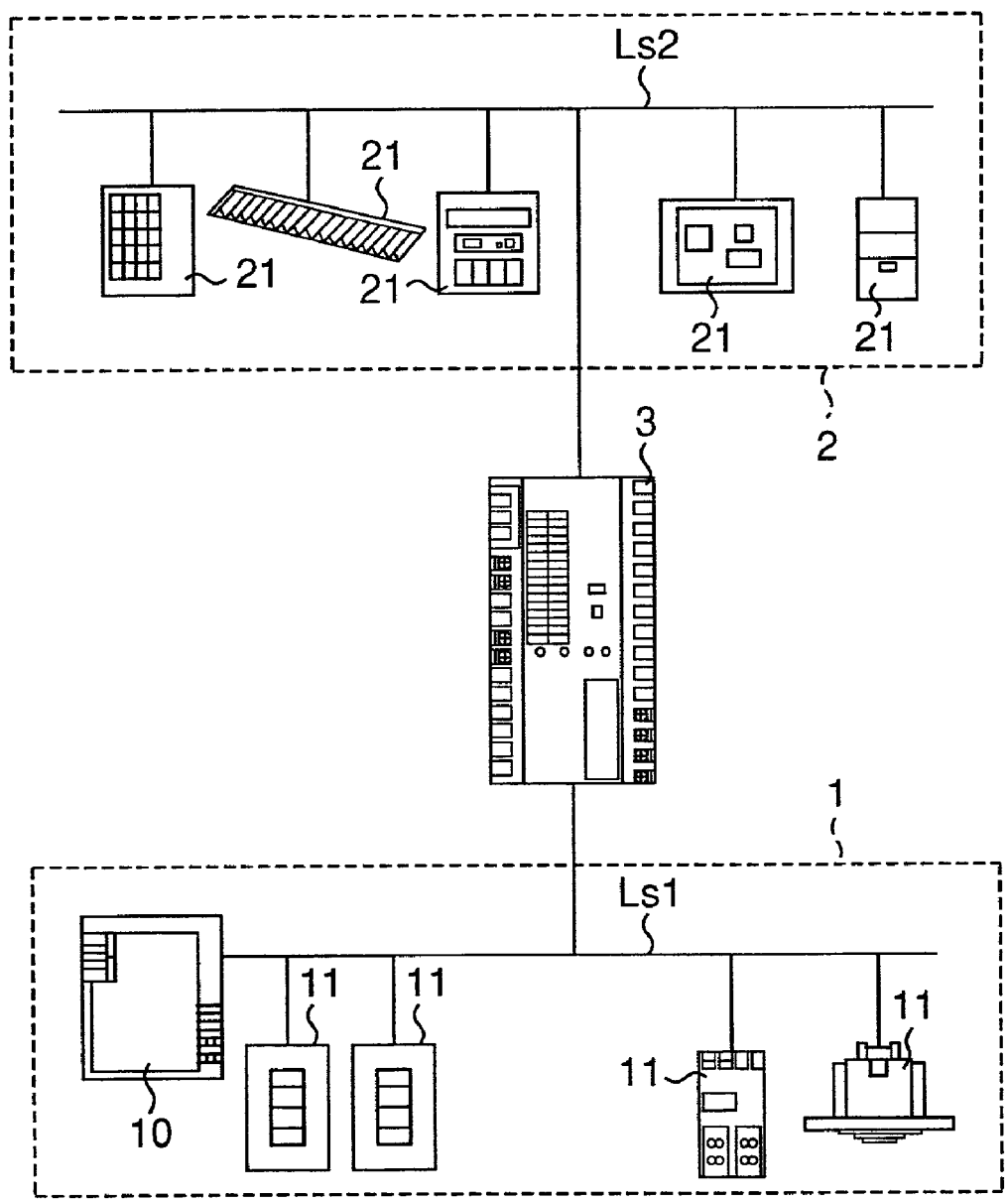
FIG. 2 is a block diagram showing a structure of the intersystem interface apparatus 3, a polling communication system 1 and a convention communication system 2 according to the first preferred embodiment.

FIG. 1 is a block diagram showing a structure of an inter-system interface apparatus 3 according to a first preferred embodiment of the present invention, and FIG. 2 is a block diagram showing a structure of the inter-system interface apparatus 3, a polling communication system 1 and a convention communication system 2 according to the first preferred embodiment.

In the present preferred embodiment, there will be described as an example, the inter-system interface apparatus 3 for performing mutual information exchange or transmission and receipt of information between the polling communication system 1 (it is assumed as a "full two-wire remote control system" proposed by the applicant of the present application) and the contention communication system 2 (it is assumed as a "Lon works system" proposed by Echelon Corporation). The inter-system interface apparatus 3 according to the present preferred embodiment of the present invention is basically used in a structure shown in FIG. 2, and the inter-system interface apparatus 3 is connected between a signal line Ls1 of the polling communication system 1 and a signal line Ls2 of the contention communication system 2.

In the polling communication system 1, a plurality of terminal units 11 each having a predetermined address allocated to each terminal unit 11 are connected to a transmission unit 10 via the signal line Ls1. The transmission unit 10 transmits a transmission signal addressing a predetermined terminal unit 11 to the signal line Ls1 by the time division multiplexing access. The terminal unit 11 having an address matched with the address selected by the transmission signal receives the transmission signal and executes an operation of the contents instructed by the transmission signal. The transmission signal contains at least an address of the terminal unit 11 representing a destination from the transmission unit 10, control data representing control contents, and a return signal time interval for receiving data from the terminal unit 11. For example, if the terminal unit 11 is a unit that monitors an operation of a switch (it is assumed basically as a switch hereinafter, and it can be the other input means or devices such as a sensor, wireless switches, card switches, contact input devices and thermal detecting sensors etc.), the terminal unit 11 returns the contents of the operation of the switch when the address thereof is selected by the transmission signal. If the terminal unit 11 is a unit for controlling a load such as an illumination load, the terminal unit 11 controls the load in accordance with the contents of the control contained in the transmission signal when the address thereof is selected by the transmission signal. Information as to that the load has been controlled is transmitted in a predetermined time interval of the return signal, and this information is used to confirm that the load has been controlled.

On the other hand, the contention communication system 2 is configured such that a plurality of node units 21 are connected to a signal line Ls2, and each node unit 21 checks to see whether or not the carriers of other node units 21 are present in the signal line Ls1, and transmit a desired transmission signal to the signal line Ls2 if necessary, during a time interval when no carrier from the other node units 21 is detected. The transmission signal contains at least a source address representing an address of the node unit 21 of a signal source, a destination address representing an address of the node unit 21 of the destination, and a network variable for instructing the contents for control. For example, when a switch is operated, the node unit 21 having the switch checks to see that no carrier is present in the signal line Ls2, and then transmits a transmission signal addressing a destination address to the signal line Ls2. The node unit 21 having an address matched with the destination address specified by the transmission signal receives the transmission signal, and operates in accordance with the contents of the network variable. In this case, a transmission signal for acknowledgement is sent from the destination node unit 21 to the source node unit 21.

Referring to FIG. 1, the inter-system interface apparatus 3 provided between the polling communication system 1 and the contention communication system 2 as described above includes first and second signal processing sections 31 and 32. The first signal processing section 31 is connected to the signal line Ls1 of the polling communication system 1, and transmits and receives signals by the time division multiplexing access to and from the transmission unit 10 in a manner similar to that of the terminal units 11. The second signal processing section 32 is connected to the signal line Ls2 of the contention communication system 2 via a transceiver 33, and transmits and receives signals to and from the other node units 21 in a manner similar to that of the node units 21. Between the first signal processing section 31 and the second signal processing section 32, there is provided a control section 30 mainly composed of a microcomputer, and the control section 30 converts signal formats of the transmission signals between the first signal processing section 31 and the second signal processing section 32. The power is supplied to the inter-system interface apparatus 3 through a power source section 34, which is additionally equipped with a current flow indication light 35.

By the way, since the control section 30 supports and controls both of the polling communication system 1 and the contention communication system 2, the control section 30 is provided with an address setting section 12 and an address storage section 13 for setting addresses for use in the polling communication system 1. The address setting section 12 has a function to transmit and receive wireless or radio signals to and from a setter device 4 for inputting and setting addresses. The addresses transmitted by means of wireless signals from the setter device 4 are written onto the address storage section 13 of a nonvolatile memory such as an EEPROM. The address storage section 13 of the present preferred embodiment can accommodate up to 16 addresses, and the control section 30 can function equivalently as 16 terminal units 11. The control section 30 is additionally equipped with a reception indication light 14 that flashes when a signal from the polling communication system 1 is received or a wireless signal sent from the setter 4 is received. Further in the present preferred embodiment, a combination of a plurality of addresses stored in the address storage section 13 can be selected from a plurality of kinds (four kinds in the present preferred embodiment), and this selection as to which combination should be used is done by a combination selecting switch 15 provided in the control section 30.

On the other hand, in order to support and control the contention communication system 2, the control section 30 is provided with a state storage section 22 for storing correspondence relationship between addresses and network variables for instructing the contents for control to the node units 21. In the state storage section 22, there are stored 16 addresses and the names of the node units 21 corresponding to the respective node units 21 associated with the network variables. The state storage section 22 is of a nonvolatile memory such as an EEPROM, and the contents of the state storage section 22 are basically set and stored through the signal line Ls2. The control section 30 is equipped with a signal light 23 for turning on when the signal line Ls2 carries a transmission signal, and a signal reception light 24 for turning on when a transmission signal matched with an address stored in the state storage section 22 is received form the signal line Ls2. Further, the second signal processing section 32 is equipped with a service pin (switch) 25 and a service light 26. When the service pin 25 is turned on, the contents of the state storage section 22 are sent to the signal line Ls2. The service light 26 informs the user by lighting states whether or not the network variable and the address are registered in the state storage section 22.

In the present preferred embodiment as described above, there are provided 16 addresses for each of the polling communication system 1 and the contention communication system 2, and the addresses of the respective systems 1 and 2 are mapped to each other. In this case, the addresses are mapped to each other in one to one correspondence. These mapping information is stored in an internal memory 30a of the control section 30. In the present preferred embodiment, bi-directional information exchange or bi-directionally transmitting and receiving information signals is made between the polling communication system 1 and the contention communication system 2, however, information as to respective addresses can be transmitted only in one direction. Accordingly, in order to set the transmission direction of information or data to be transmitted between the respective systems 1 and 2, there is provided a direction selecting switch 36 in the control section 30 for specifying the transmission direction of information or data for every pair of addresses of the polling communication system 1 and the contention communication system 2 mapped to each other.

The direction selecting switch 36 is, for example, of a dip switch having 16 contact points which are made to correspond to respective addresses, and ON/OFF operation of each of the contact points determines the direction upon transmitting information or data between the polling communication system 1 and the contention communication system 2. For example, each contact point in an ON state represents information transmission from the polling communication system 1 to the contention communication system 2, whereas each contact point in an OFF state represents information transmission from the contention communication system 2 to the polling communication system 1. In other words, this equivalently means providing an interface device having 16 contact points, and the direction of the information transmission for each contact point can be set.

Figure 3A:
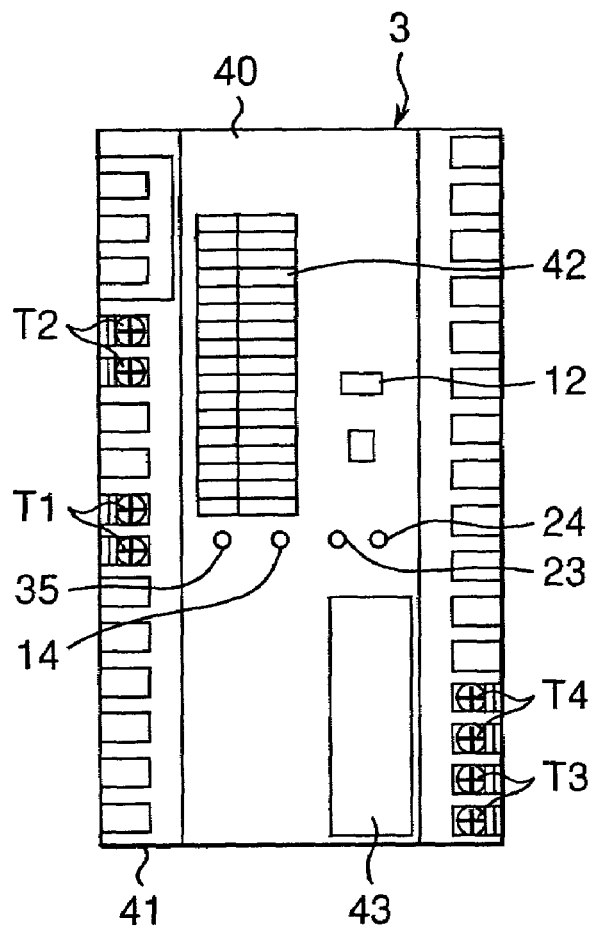
FIGS. 3A, 3B, and 3C are respectively a front view, a side view and a bottom view showing an appearance of the inter-system interface apparatus 3 shown in FIGS. 1 and 2.
Figure 4A:
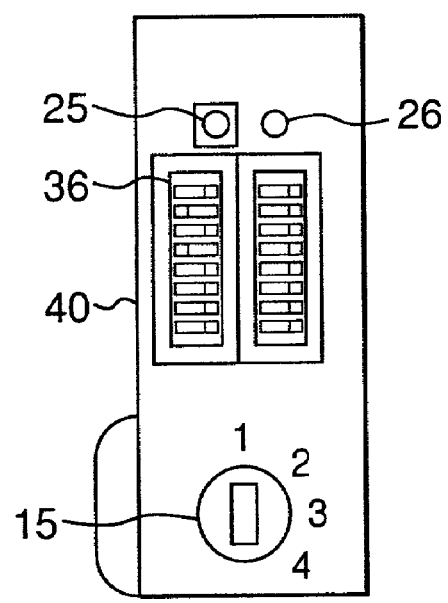
FIG. 4A is a front view of a part which is covered by a door 43 shown in FIG. 3A.
Figure 4B:
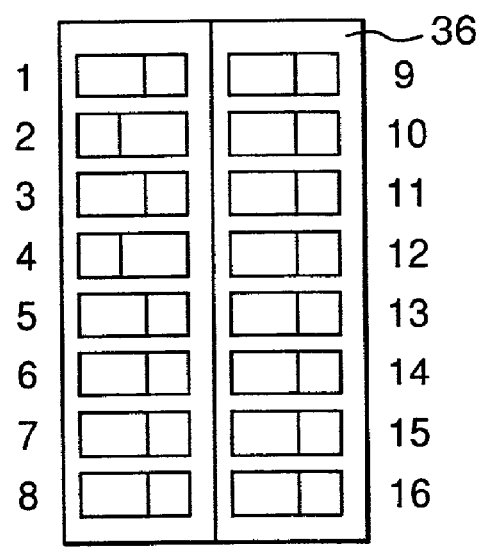
FIG. 4B is a front view of a direction selecting switch 36 shown in FIG. 4A.

FIG. 4A is a front view of a part which is covered by a door 43 shown in FIG. 3A, and FIG. 4B is a front view of a direction selecting switch 36 shown in FIG. 4A. For example, FIG. 4B shows an example of the direction selecting switch 36. In this case, 16 contact points are numbered, and only the contact points of Nos. 2 and 4 are turned on (this means information transmission from the polling communication system 1 to the contention communication system 2), while all the remaining contact points are turned off. In the preferred embodiment, the direction selecting switch 36 is provided, however, the present invention is not limited to this, and information signal for instructing the direction of the information transmission may be sent through the signal line Ls2 of the contention communication system 2.

Figure 5:
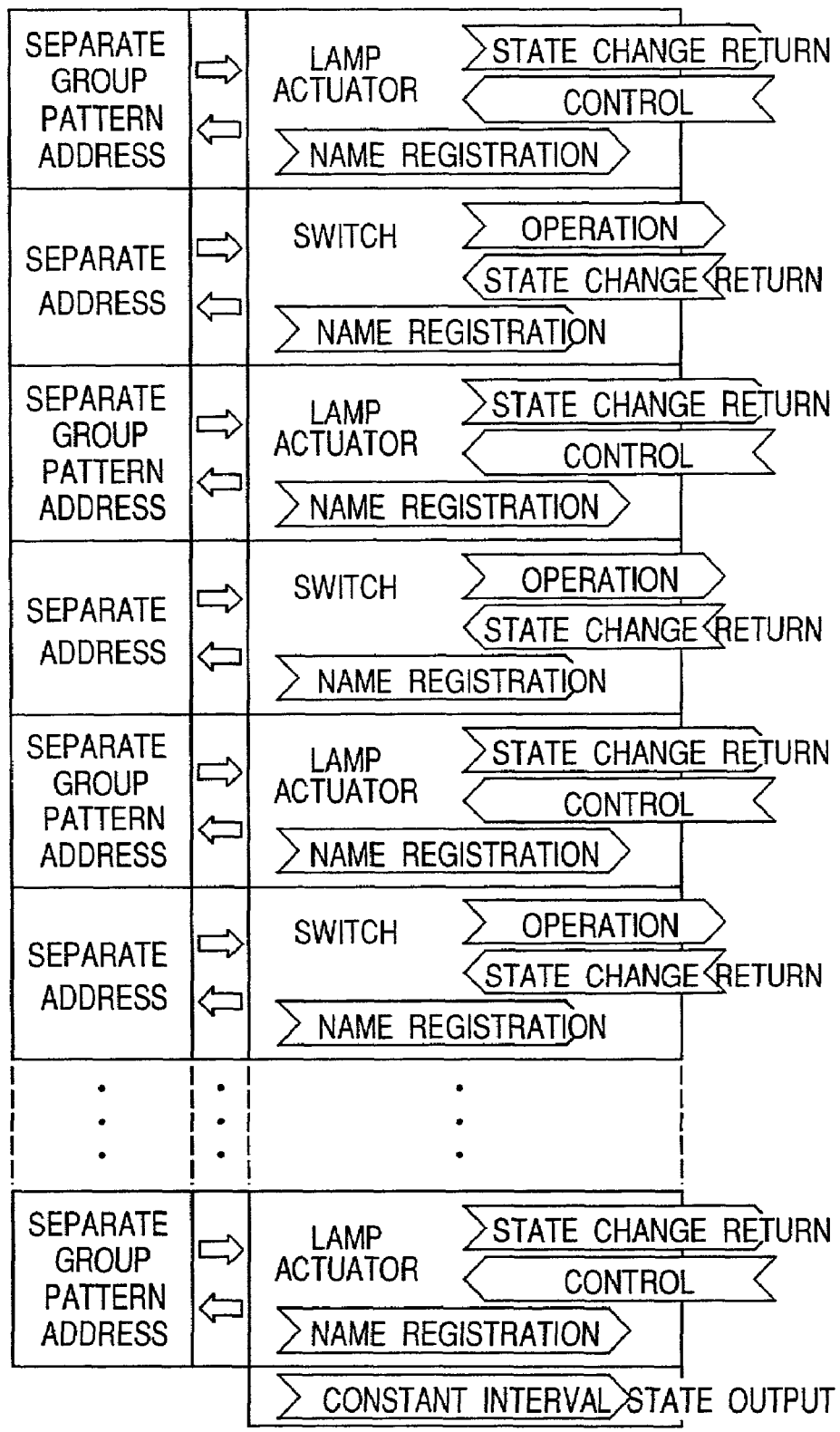
FIG. 5 is an explanatory view showing contents for control by the inter-system interface apparatus 3 provided between the polling communication system 1 and the convention communication system 2 shown in FIG. 2.

FIG. 5 is an explanatory view showing contents for control by the inter-system interface apparatus 3 provided between the polling communication system 1 and the convention communication system 2 shown in FIG. 2, and FIG. 5 shows an example of the contents for control of respective contact points.

Referring to FIG. 5, the left column of FIG. 5 means the address of the polling communication system 1, and "Separate", "Group" and "Pattern" means methods of address setting, respectively. In other words, since an address is set to each terminal unit 11 of the polling communication system 1, one switch can control not only one load (such a control is referred to as "Separate" control hereinafter), but also a plurality of loads collectively by batch-control. Such a collective or batch control is available in two types of controls: (a) a "Group" control for controlling control targets or a plurality of loads so as to be in the same condition; and (b) a "Pattern" control for controlling control targets or a plurality of loads upon operation of a switch with control patterns registered in advance. The right column of FIG. 5 shows these control types. In the polling communication system 1, in addition to these addresses, there are addresses each used for controlling "Dimming" of an illumination load. Also, arrow-like symbols shown in the right column of FIG. 5 show a flow of commands or instructions (network variables) in the contention communication system 2. "Control" denotes an instruction from the contention communication system 2 to the polling communication system 1, "Operation" is an instruction from the polling communication system 1 to the contention communication system 2, and "State Change Return" indicates a response to an instruction or command. "Name Registration" means that a name is given to the node unit 21 of the contention communication system 2 as associated with an address of the polling communication system 1 and is registered in the state storage section 22 of the inter-system interface apparatus 3.

The function of "Constant Interval State Output" as shown in FIG. 5 provides transmitting and returning a state information for a predetermined constant time interval without any request for state information.

First of all, description will be given of the case of controlling a load (mainly an illumination load) which is connected to the terminal unit 11 of the polling communication system 1 in accordance with an instruction from the node unit 21 having a switch in the contention communication system 2. The action of the first signal processing section 31 operates having a function similar to that of the terminal units 11 each for monitoring an operation of the switch through the signal line Ls1 of the polling communication system 1. An address of such type of terminal unit 11 is set to either one of "Separate", "Group", "Pattern", and "Dimming" as described above. In the present preferred embodiment, an address set to "Separate", "Dimming" or "Group" is different from an address set to "Pattern" in the processing of the inter-system interface apparatus 3.

If the address is set to "Separate", "Dimming" or "Group", the inter-system interface apparatus 3 operates as follows. First of all, description will be made of the case where upon an operation of a switch provided to the node unit 21 of the contention communication system 2, an instruction is given to set an illumination load connected to the terminal unit 11 of the polling communication system 1 to turn on (as shown in the top row of FIG. 5).

In this case, the first signal processing section 31 checks and confirms the state of a corresponding address (switch) of the polling communication system 1. If the switch is in an OFF state, the first signal processing section 31 executes an interrupt processing on the polling communication system 1 to instruct the corresponding address of the polling communication system 1 to set the switch to turn on. In other words, the switch is operated in a manner similar that of the case where the switch is set to turn on in the terminal unit 11 for monitoring an operation of the switch. When the load is controlled by the instruction in the terminal unit 11 as connected to the load, the state of the load is returned to the first signal processing section 31 via the transmission unit 10. Accordingly, the inter-system interface apparatus 3 returns the returned load state to the node unit 21 having the switch operated in the contention communication system 2 (This operation is referred to as "State Change Return").

Further, if the state of a corresponding address (switch) of the polling communication system 1 is checked and the state is found to be in an ON state, any processing is not executed in the polling communication system 1, and the state thereof is returned to the node unit 21 having the switch operated in the contention communication system 2 (This operation is referred to "State Change Return").

Next, description will be given of the case where upon operation of a switch provided in the node unit 21 of the contention communication system 2, and an instruction is given to set an illumination load connected to the terminal unit 11 of the polling communication system 1 to turn off.

In this case, the first signal processing section 31 checks the state of a corresponding address (switch) of the polling communication system 1. If the switch is in an ON state, the first signal processing section 31 executes an interrupt processing to the polling communication system 1 to instruct the corresponding address of the polling communication system 1 to set the switch to turn off. In other words, the switch is operated in a manner similar that of the case where the switch is set to turn off in the terminal unit 11 for monitoring an operation of the switch. When the load is controlled by the instruction in the terminal unit 11 as connected to the load, the state of the load is returned to the first signal processing section 31 via the transmission unit 10. Accordingly, the inter-system interface apparatus 3 returns the returned load state to the node unit 21 having the switch operated in the contention communication system 2 ("State Change Return").

Further, if the state of a corresponding address (switch) of the polling communication system 1 is checked and the state is found to be in an OFF state, any processing is not executed in the polling communication system 1, and the state thereof is returned to the node unit 21 having the switch operated in the contention communication system 2 ("State Change Return").

The node unit 21 of the contention communication system 2 is not only capable of instructing an switch to turn ON/OFF but also capable of instructing the inter-system interface apparatus 3 to check the state of a switch provided in the polling communication system 1. In this case, the inter-system interface apparatus 3 checks the state of a corresponding address (switch) of the polling communication system 1 through the first signal processing section 31, and returns the state information to the node unit 21 of the contention communication system 2 ("State Change Return"). Further, when the state of a load in the polling communication system 1 is changed, the inter-system interface apparatus 3 sends the state information to the node unit 21 of the contention communication system 2 upon recognition of the state change of the address (switch) of the polling communication system 1 by the state matching or state verifying ("State Change Return").

By the way, when the address of the polling communication system 1 is set to "Pattern", operation is made as follows. First of all, description will be given of the case where upon operation of a switch provided in the node unit 21 of the contention communication system 2, an instruction is given to set the "Pattern" control of the polling communication system 1 to be enabled or turned on.

In this case, the first signal processing section 31 checks the state of a corresponding address (switch) of the polling communication system 1. If the "Pattern" control is disabled (in an OFF state), the first signal processing section 31 executes an interrupt processing to the polling communication system 1 to set the "Pattern" control of the corresponding address of the polling communication system 1 to be enabled or turned on. When the load is thus "Pattern" controlled, information as to the "Pattern" control enabled is returned to the first signal processing section 31 via the transmission unit 10. Accordingly, the inter-system interface apparatus 3 returns the returned information to the node unit 21 having the switch operated in the contention communication system 2 ("State Change Return").

Further, if the state of a corresponding address (switch) of the polling communication system 1 is checked and the "Pattern" control is found to be already enabled or turned on, any processing is not executed in the polling communication system 1, and the state thereof is returned to the node unit 21 having the switch operated in the contention communication system 2 ("State Change Return").

By the way, in the case where upon operation of a switch provided in the node unit 21 of the contention communication system 2, an instruction is given to set "Pattern" control of the polling communication system 1 to be disabled or turned off, the state of a corresponding address (switch) of the polling communication system 1 is checked and the state thereof is returned to the node unit 21 having the switch operated in the contention communication system 2 ("State Change Return"). It is to be noted, however, an instruction to set "Pattern" control to be disabled is not executed but neglected in the polling communication system 1.

Upon performing a "Pattern" control, the node unit 21 of the contention communication system 2 is also capable of instructing the inter-system interface apparatus 3 to check the state of "Pattern" control of a switch provided in the polling communication system 1. In this case, the inter-system interface apparatus 3 checks the state of a corresponding address (switch) of the polling communication system 1 through the first signal processing section 31, and returns the state information to the node unit 21 of the contention communication system 2 ("State Change Return"). Further, when the state of the load in the polling communication system 1 is changed, the inter-system interface apparatus 3 sends the state information to the node unit 21 of the contention communication system 2 upon recognition of the state change of the address (switch) of the polling communication system 1 by the state matching or verifying ("State Change Return").

In the above example, there was described operation for controlling a load of the polling communication system 1 in accordance with an instruction from the contention communication system 2. To the contrary, the following description discuses operation for controlling a load of the contention communication system 2 in accordance with an instruction from the polling communication system 1.

It is assumed that an illumination load provided in the node unit 21 of the contention communication system 2 is controlled by an operation of a switch provided in the terminal unit 11 of the polling communication system 1 (See the second row of FIG. 5). When the terminal unit 11 for monitoring an operation of a switch in the polling communication system 1 sends an instruction of turning on or off the illumination load, the inter-system interface apparatus 3 gives a command or instruction of turning on or off the illumination load to the node unit 21 of the contention communication system 2 through the second signal processing section 32 ("Operation"). Upon reception of the "Operation", the node unit 21 controls the illumination load and returns the state ("State Change Return"). Upon receiving the "State Change Return", the inter-system interface apparatus 3 associates it with the state of a corresponding address of the polling communication system 1, and informs the terminal unit 11 monitoring the operation of the switch of the polling communication system 1 that the load state was changed, namely, changing the lighting state of the indication light provided in the terminal unit 11.

In this case, if no function for setting of returning the load state change is given to the node unit 21 of the contention communication system 2, the load state change is reported to the polling communication system 1 when the "Operation" is outputted to the node unit 21 of the contention communication system 2. Further, when the state of the illumination load provided in the node unit 21 of the contention communication system 2 is changed not by an instruction from the polling communication system 1, and if the terminal unit 11 associated with the node unit 21 is present in the polling communication system 1, the corresponding information is sent to the terminal unit 11 through the transmission unit 10 in the polling communication system 1 at the time when the inter-system interface apparatus 3 receives the "State Change Return".

Figure 6:
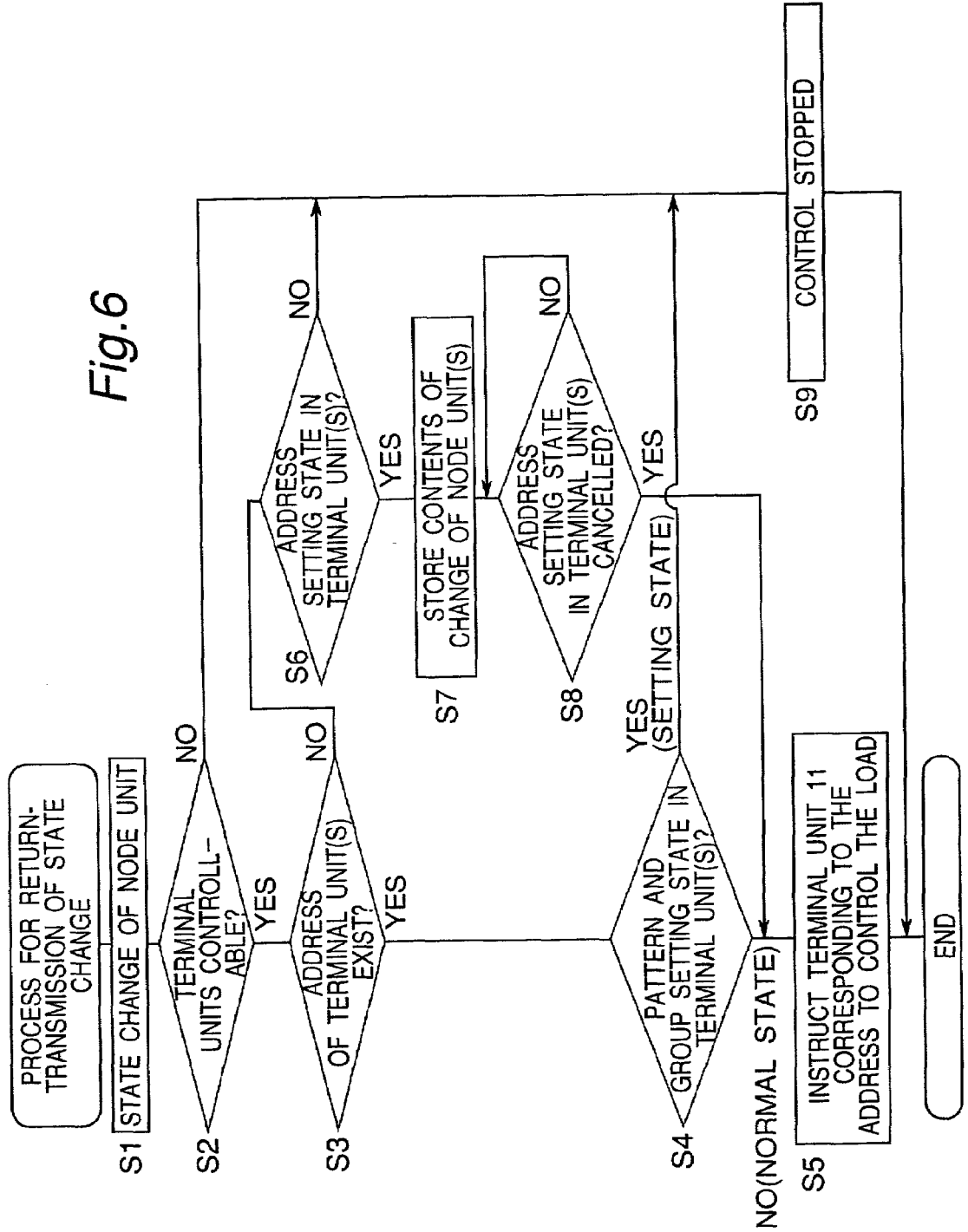
FIG. 6 is a flowchart showing an operation of the inter-system interface apparatus 3 shown in FIG. 1.

FIG. 6 is a flowchart showing an operation of the inter-system interface apparatus 3 shown in FIG. 1. Brief description will be given of the operation relating to "State Change Return" from the node unit 21 of the contention communication system 2 with reference to FIG. 6.

Referring to FIG. 6, in accordance to the "State Change Return" from the node unit 21 (S1), it is checked whether or not the polling communication system 1 operates normally (S2). If the polling communication system 1 is controllable (Yes in S2), it is checked whether or not the address is set in the address storage section 13 (S3). If the address is set (Yes in S3), it is checked whether or not the unit having the address is in the state of collective or batch control ("Pattern" control or "Group" control) (S4). If it is not in the state of collective control (No in S3), a terminal unit 11 corresponding to the address of the polling communication system 1 is instructed to control the load (S5). If it is in the state of collective control in the step S4 (Yes in S4), the control is stopped (S9).

By the way, if the address of the polling communication system 1 does not exist in the step S3 (No in S3), it is checked whether or not the terminal unit is in the address setting mode (S6). If the terminal unit is in the address setting mode (Yes in S6), the "State Change Return" from the node unit 21 is temporarily stored (S7), and after the address setting mode is cancelled (S8), a terminal unit 11 corresponding to the address of the polling communication system 1 is instructed to control the load (S5). If the terminal unit is not in the address setting state or mode in the step S6 (No in S6), the control is stopped because no address exists (S9). Similarly, if the polling communication system 1 does not operate normally in the step S2 (No in S2), the control is also stopped (S9).

Figure 3B:
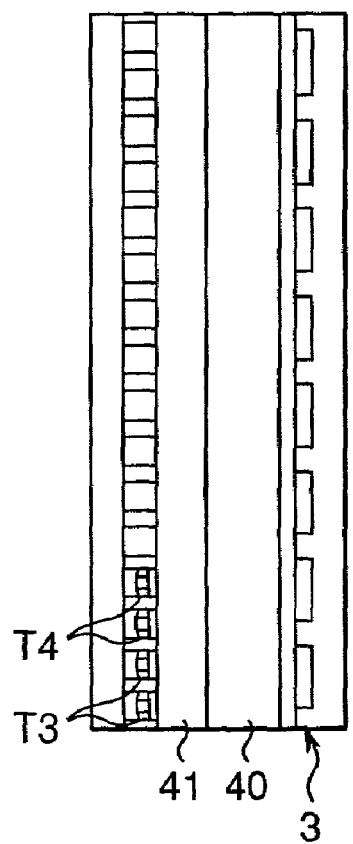
Figure 3C:
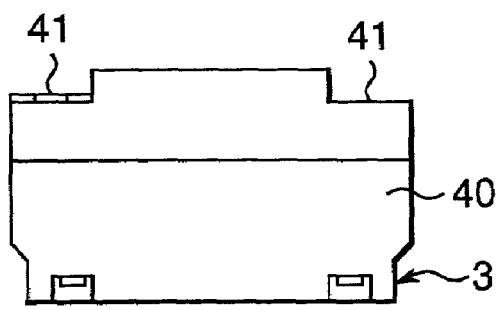

FIGS. 3A, 3B, and 3C are respectively a front view, a side view and a bottom view showing an appearance of the inter-system interface apparatus 3 shown in FIGS. 1 and 2. The above-described inter-system interface apparatus 3 is accommodated, as shown in FIGS. 3A, 3B and 3C, in an equipment body 40 having agreed sizes of distribution board. On the both sides of the equipment body 40, there is provided a terminal board 41 having a threaded terminal. The terminal board 41 on the left side in FIG. 3A is provided with a signal terminal T1 for connecting the signal line Ls1 of the polling communication system 1, and a power source terminal T2 for connection the power source (AC 24V). The terminal board 41 on the right side is provided with a signal terminal T3 for connecting the signal line Ls2 of the contention communication system 2, and a grounding terminal T4 for grounding. On the front surface of the equipment body 40 (front surface of FIG. 3A), there are arranged a power supply indication light 35, a reception indication light 14, a signal light 23, a signal reception light 24, and an address setting section 12. Further on the front surface of the equipment body 40, there is also provided a name section 42 for representing the addresses and their names (each represents "load name" containing a name of a switch as well as a name of a load) of the polling communication system 1 and the contention communication system 2 so that the addresses and their names are made to correspond to each other between the polling communication system 1 and the contention communication system 2. A door 43 is placed on the front surface of the equipment body 40, and in the area covered with the door 43, there are provided the above-described combination selecting switch 15, the service pin 25, the service light 26, and the direction selecting switch 36 as shown in FIG. 4A.

As described above, in the present preferred embodiment, there are provided 16 interface circuits of one interface apparatus, each of which can perform data exchange or information exchange between the terminal unit 11 of the polling communication system 1 and the node unit 21 of the contention communication system 2, and this leads to simplification of the system configuration as compared with the case of configuring 16 individual interface apparatuses, and therefore, this leads to easy connection with the signal lines Ls1 and Ls2.

Second Preferred Embodiment

Figure 7:
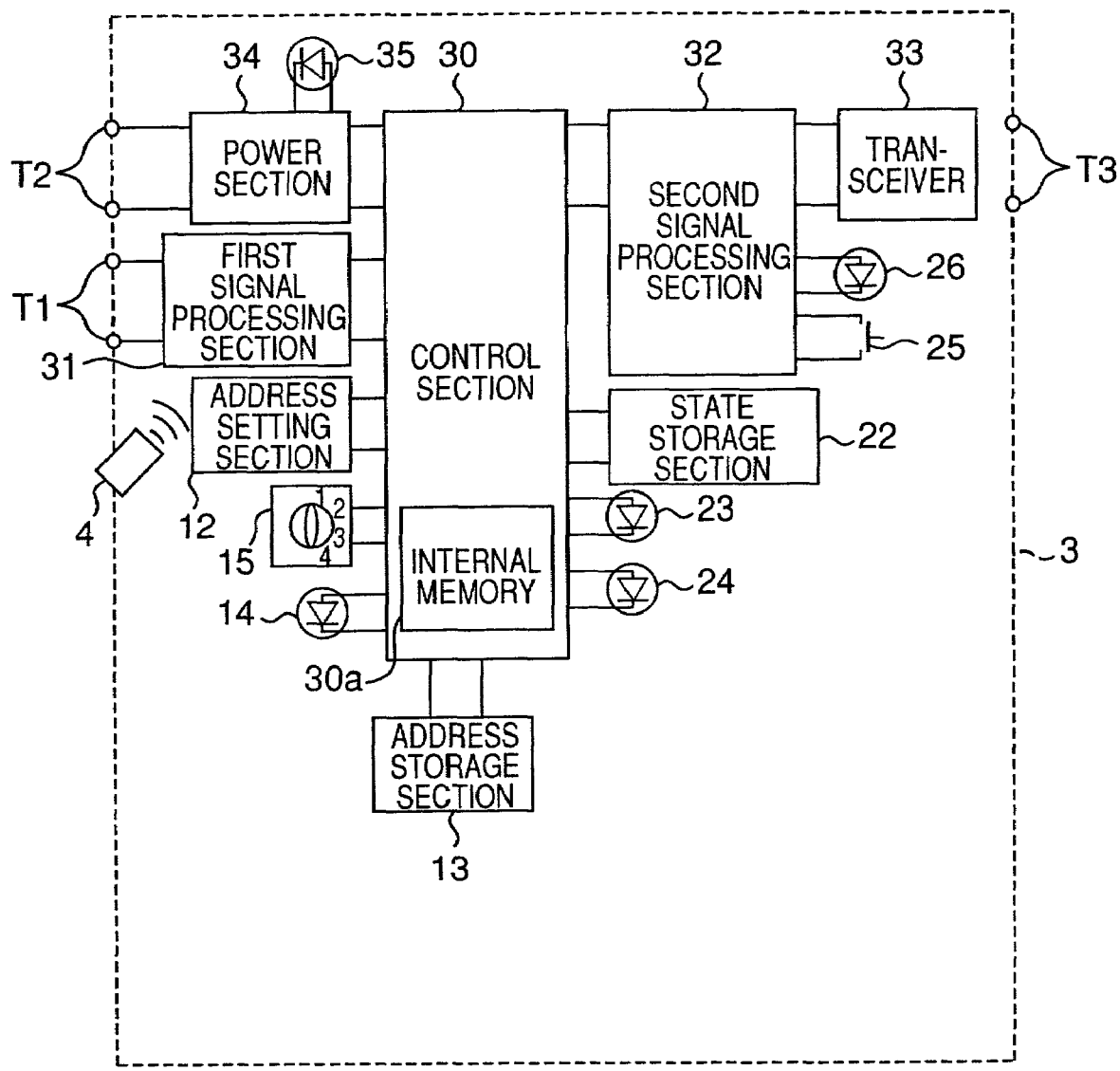
FIG. 7 is a block diagram showing a structure of the inter-system interface apparatus 3 according to a second preferred embodiment of the present invention.

FIG. 7 is a block diagram showing a structure of the inter-system interface apparatus 3 according to a second preferred embodiment of the present invention. The second preferred embodiment is structured as shown in FIG. 7 by omitting the function of "Operation" from the contention communication system 2 to the polling communication system 1 in the first preferred embodiment.

Figure 8:
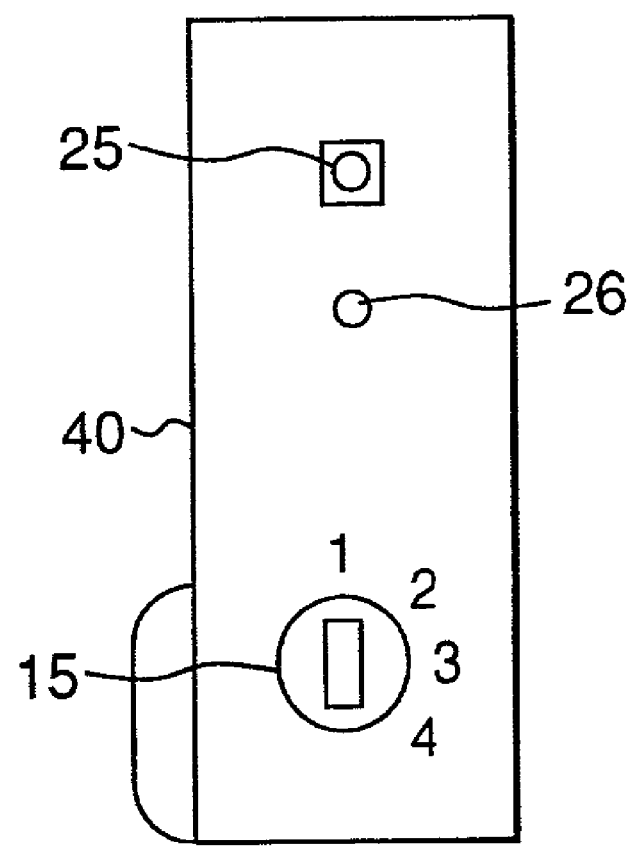
FIG. 8 is a front view showing a front view of a part which is covered by the door 43 of the second preferred embodiment shown in FIG. 7.

FIG. 8 is a front view showing a front view of a part which is covered by the door 43 of the second preferred embodiment shown in FIG. 7. In the second preferred embodiment, the direction selecting switch 36 is omitted, and in the area covered with the door 43 on the front surface of the equipment body 40, there are provided only the combination selecting switch 15, the service pin 25, and the service light 26 as shown in FIG. 8.

Figure 9:
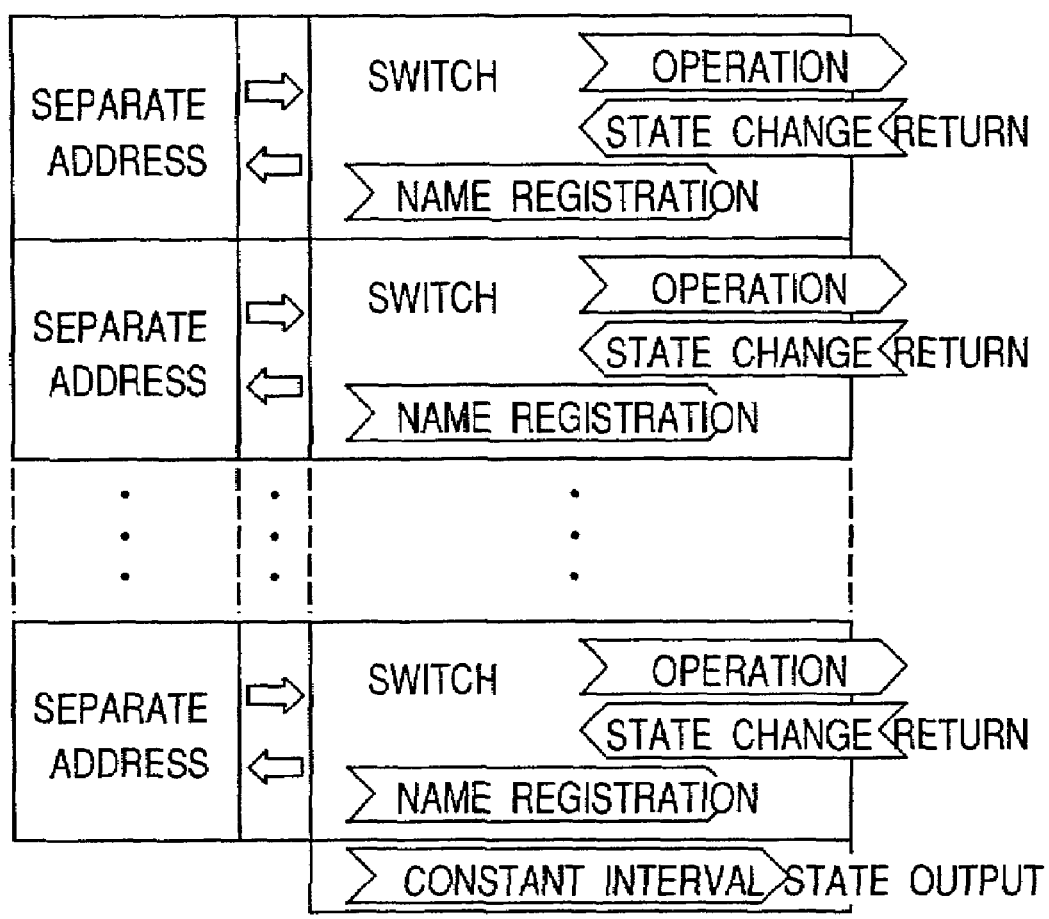
FIG. 9 is an explanatory view showing contents for control by the inter-system interface apparatus 3 provided between the polling communication system 1 and the convention communication system 2 shown in FIG. 7.

FIG. 9 is an explanatory view showing contents for control by the inter-system interface apparatus 3 provided between the polling communication system 1 and the convention communication system 2 shown in FIG. 7. Since there is performed only the "Operation" from the polling communication system 1 to the contention communication system 2, the function of "Lamp Actuator" of FIG. 5 is omitted in the present preferred embodiment as shown in FIG. 9. The other structural and operational components are similar to those of the first preferred embodiment.

Since this structure is dedicated to the "Operation" from the polling communication system 1 to the contention communication system 2, the address of the polling communication system 1 becomes always the address of the terminal unit 11 for controlling the load, and this leads to simplification of address setting. Also, from the viewpoint of the contention communication system 2, the inter-system interface apparatus 3 is always regarded as a node unit 21 having a switch, and this leads to easy system construction.

Third Preferred Embodiment

Figure 10:
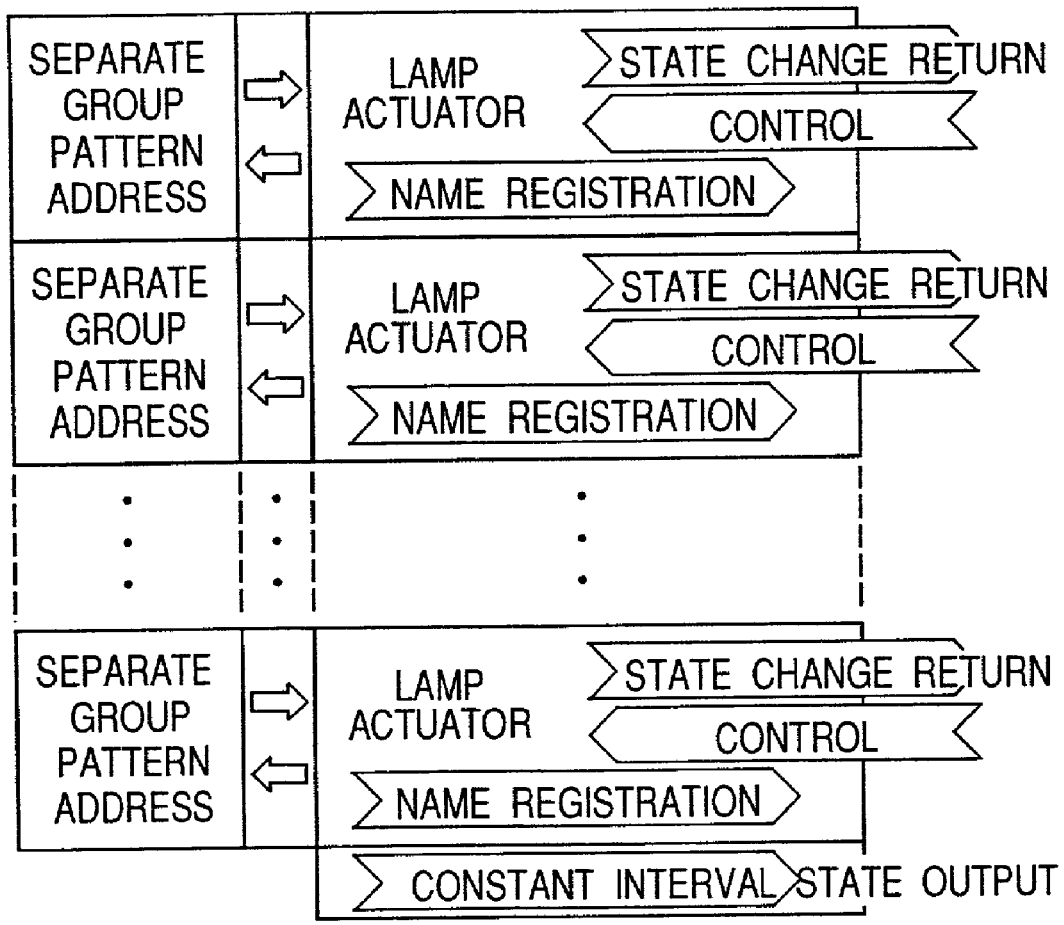
FIG. 10 is an explanatory view showing contents for control by the inter-system interface apparatus 3 provided between the polling communication system 1 and the convention communication system 2 according to a third preferred embodiment of the present invention.

FIG. 10 is an explanatory view showing contents for control by the inter-system interface apparatus 3 provided between the polling communication system 1 and the convention communication system 2 according to a third preferred embodiment of the present invention.

Contrary to the second preferred embodiment, the third preferred embodiment is structured by omitting the function of "Control" from the polling communication system 1 to the contention communication system 2 in the first preferred embodiment. Therefore, in the present preferred embodiment, it is not required to provide the direction selecting switch 36 shown in FIG. 1. Since there is performed only the "Control" from the contention communication system 2 to the polling communication system 1, the function of the "switch" of FIG. 5 is omitted in the present preferred embodiment as shown in FIG. 10. The other structural and operational elements are similar to those of the first preferred embodiment.

Since this structure is dedicated to the "Control" from the contention communication system 2 to the polling communication system 1, the address of the polling communication system 1 becomes always the address of the terminal unit 11 for monitoring the operation of the switch, and this leads to easy address setting. Also, from the viewpoint of the contention communication system 2, the inter-system interface apparatus 3 is always regarded as a node unit 21 having a load, and this leads to easy system construction. It is to be noted that the combined use of the intersystem interface apparatus 3 of the present preferred embodiment and the inter-system interface apparatus 3 of the second preferred embodiment allows the "Control" and the "Operation" between the polling communication system 1 and the contention communication system 2, and this leads to that the system similar to that of the first preferred embodiment can be constructed. In this case, each inter-system interface apparatus 3 is capable of performing only either the "Control" or the "Operation", and this leads to that this structure becomes more convenient than that of the first preferred embodiment in such a point of easy address setting or the like.

Fourth Preferred Embodiment

Referring to FIG. 9, for instructing the "Operation" from the polling communication system 1 to the contention communication system 2, the "Separate" address of the polling communication system 1 is used. In other words, one switch operation of the polling communication system 1 is associated with one address of the contention communication system 2. However, the polling communication system 1 is provided with the function of controlling a plurality of loads with one switch ("Group" control and "Pattern" control), and therefore, it is convenient if the similar function is implemented in the node unit 21 of the contention communication system 2. Namely, since the number of addresses available in the polling communication system 1 is limited and one to one correspondence or mapping between the terminal unit 11 and the node unit 21 may decrease the number of available addresses for the terminal units 11 of the polling communication system 1. Accordingly, there is adopted such a structure for allowing address mapping of the node unit 21 to the terminal unit 11 in one to plural or many correspondence in addition to one to one correspondence. In a manner similar to that of the second preferred embodiment, however, the basic structure is adapted which allows only the "Operation" from the polling communication system 1 to the contention communication system 2.

Figure 11:
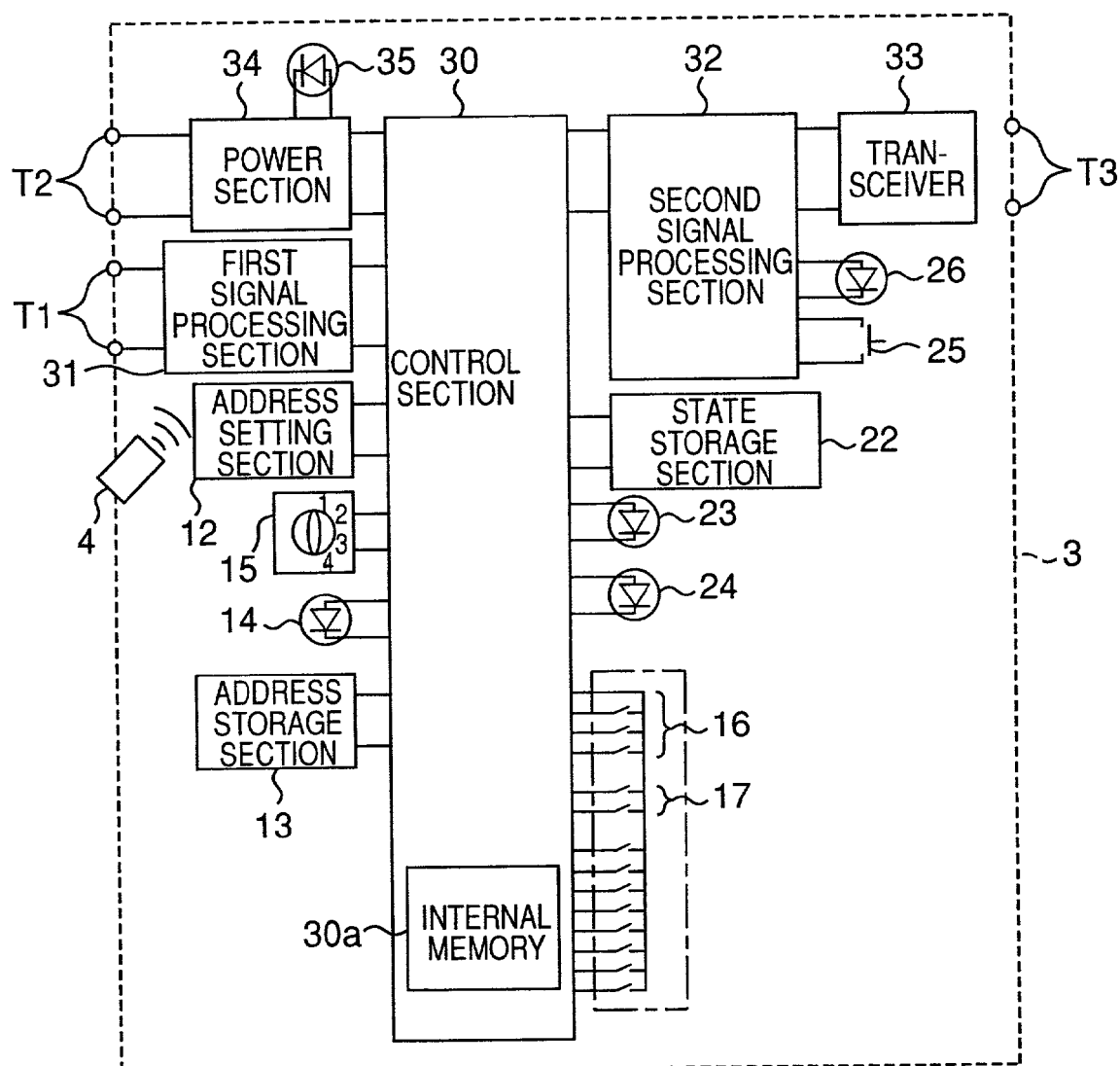
FIG. 11 is a block diagram showing a structure of the inter-system interface apparatus 3 according to a fourth preferred embodiment of the present invention.

FIG. 11 is a block diagram showing a structure of the inter-system interface apparatus 3 according to a fourth preferred embodiment of the present invention. Referring to FIG. 11, the basic structure of the present preferred embodiment is similar to that of the second preferred embodiment shown in FIG. 7 except for such main different points that a correspondence selecting switch 16 of 3-bit dip switches and an operation selecting switch 17 of 2-bit dip switches are added.

Figure 12A:
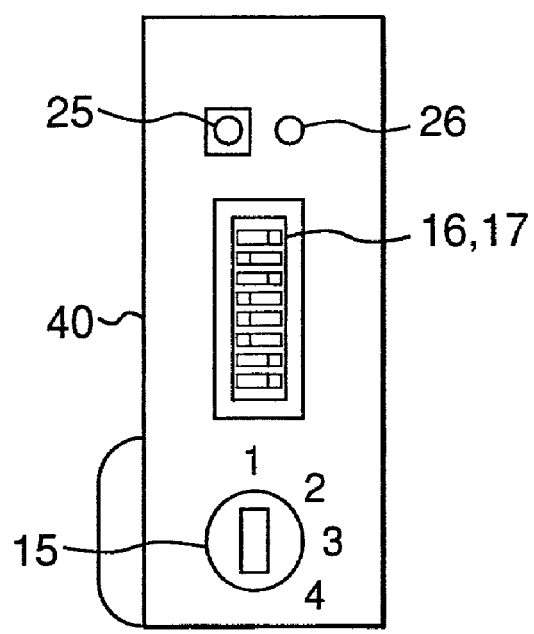
FIG. 12A is a front view of a part which is covered by the door 43 of the fourth preferred embodiment.
Figure 12B:
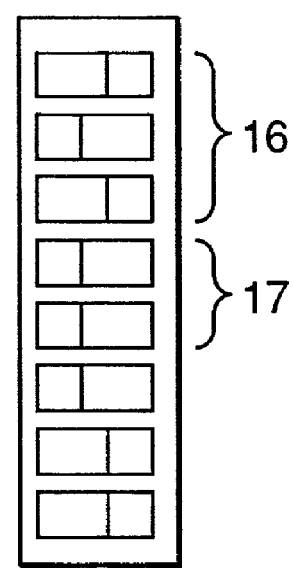
FIG. 12B is a front view of a correspondence selecting switch 16 and an operation selecting switch 17 shown in FIG. 12A.

FIG. 12A is a front view of a part which is covered by the door 43 of the fourth preferred embodiment, and FIG. 12B is a front view of a correspondence selecting switch 16 and an operation selecting switch 17 shown in FIG. 12A. Referring to FIG. 12A, the correspondence selecting switch 16 and the operation selecting switch 17 are provided together with the combination selecting switch 15 in the area covered with the door 43 on the equipment body 40 as shown in FIG. 12A. Referring to FIG. 12B, at least total 5-bit dip switches are provided with the other spare dip switches.

In the present preferred embodiment, the number of addresses of the contention communication system 2 controllable with one address of the polling communication system 1 is selectable from 1, 2, 4, 8, and 16. Therefore, a ratio of the number of addresses in the polling communication system 1 to the number of addresses in the contention communication system 2 is selectable from 1:1, 1:2, 1:4, 1:8, and 1:16. For this selection, the correspondence selecting switch 16 is provided. The relation between the setting values of the correspondence selecting switch 16 and the ratio of the number of addresses is such that with the setting values of 0, 1, 2, 3 and 4, the ratio is 1:1, 1:2, 1:4, 1:8, and 1:16, respectively. In other words, when the setting value is 0, 1, 2, 3, and 4, the number of addresses of the polling communication system 1 for use is 16, 8, 4, 2, and 1, respectively.

As described above, when a plurality of loads in the contention communication system 2 are controllable by one switch in the polling communication system 1, a "State Change Return" is transmitted from a plurality of the node units 21. In this case, in the present preferred embodiment, the control section 30 is capable of delivering or handing over the "State Change Return" that is properly combined into one information to the polling communication system 1. The "State Change Return" signal is a binary signal, where the ON state thereof is allocated to "1" and the OFF state thereof is allocated to "0". In order to thus combine a plurality of binary signals into one signal, four logic operations including "OR", "AND", "NOR" and "NAND" are selectively used in the present preferred embodiment, and selection of the logical operation to be applied is made by the operation selecting switch 17. More particularly, when the setting values of 0, 1, 2, and 3 are selected by the operation selecting switch 17, and logical operations "OR", "AND", "NOR" and "NAND" are selected, respectively.

The following description will discuss information obtained by applying each logical operation.

First of all, when an logical operation of "OR" is selected, if any one of the node units 21 controlled in the contention communication system 2 is in an ON state, the result of the outputted operation is an ON state. More particularly, when OFF is a desirable state of the node units 21 of the contention communication system 2, this logical operation may be used for monitoring the presence of the node units 21 in an ON state. For example, in the case where the node units 21 are for turning on and off illumination loads, the resulting output of an ON state as the result of the logical operation of "OR" represents that at least one illumination load is turned on. Therefore, the logical operation may be used for monitoring whether or not any illumination load is left turning off. If information as to any illumination load left turning off is indicated in the polling communication system 1, it is possible to turn off all the illumination loads by operating the switch of the polling communication system 1.

When a logical operation of "AND" is selected, if any one of the node units 21 controlled in the contention communication system 2 is in an OFF state, the result of the outputted operation becomes an OFF state. More particularly, when ON is a desirable state of the node units 21 of the contention communication system 2, this logical operation may be used for monitoring the presence of the node units 21 in an OFF state. For example, in the case where the node units 21 are for controlling various units, the output of OFF as the result of the logical operation "AND" represents that at least one unit is stopped. Therefore, this logical operation may be used for monitoring if any unit is stopped. If any stopped unit is indicated in the polling communication system 1 under the circumstance that all the units should be in an operating state, it is possible to shift all the units to the operating state by operating the switch in the polling communication system 1.

If a logical operation of "NOR" is selected when any one of the node units 21 controlled in the contention communication system 2 is in an OFF state, the result of the outputted operation is an OFF state. In other words, only when all the node units 21 controlled in the contention communication system 2 are in an OFF state, the result of the outputted operation is an ON state. Therefore, since the result of the operation of an ON state is outputted when all the units controlled in the contention communication system 2 are stopped, the outputted result represents occurrence of abnormality. Consequently, upon occurrence of abnormality, it is possible to set the system so as to ignore any instruction by the switch operation in the polling communication system 1. In other words, the function may be used as a sort of safety switch.

If a logical operation of "NAND" is selected when any one of the node units 21 controlled in the contention communication system 2 is in an OFF state, the result of the outputted operation becomes an ON state. More particularly, when any one of the node units 21 of the contention communication system 2 is in OFF state, an ON state is indicated in the polling communication system 1. If an ON state is indicated, the terminal unit 11 for monitoring the switch operation in the polling communication system 1 sets the load to an OFF state in the next switch operation. This allows collective or batch stop of units that are control targets in the contention communication system 2, with this switch operation. In other words, if any one of the units controlled in the contention communication system 2 is stopped, the function is used as a safety switch to set all the units within a predetermined range an OFF state.

Although, in the above examples, the correspondence selecting switch 16 and the operation selecting switch 17 are made of dip switches, the similar selection may be instructed through the signal line Ls2 of the contention communication system 2 without using the correspondence selecting switch 16 nor the operation selecting switch 17.

Also in the present preferred embodiment, there is shown an example of mapping the terminal unit 11 to the node unit 21 in one to plural or many correspondence where one of logical operations of "OR", "AND", "NOR" and "NAND" is performed. However, in the case of mapping the terminal unit 11 to the node unit 21 in one to one correspondence, one of logical operations of "OR", "AND", "NOR" and "NAND" may be naturally performed for monitoring the operating state of the node unit 21. In this case, the other structural and operational components are similar to those of the first preferred embodiment.

ADVANTAGEOUS EFFECTS OF PREFERRED EMBODIMENTS

According to the preferred embodiments of the present invention, the inter-system interface apparatus 3 allows mapping of one input to another load unit or makes correspondence between the polling communication system 1 and the contention communication system 2. In addition to this, the inter-system interface apparatus 3 can function equivalently as a plurality of terminal units 11 for the polling communication system 1, and can function equivalently as a plurality of node units 21 for the contention communication system 2. This leads to controlling a plurality of load units in response to a plurality of inputs by connecting the terminal units 11 to the signal line Ls1, connecting the node units 21 to the signal line Ls2, and setting simple connection relationship.

When the control section 30 executes only one processing out of the above-mentioned two processings, the interface apparatus provides only one function, and it is make the whole system easily.

When the state storage section 22 stores not only respective addresses of a plurality of node units 21, but also the names of the node units 21 corresponding to the respective addresses, then the names of the node units 21 can be set, and the correspondence relationship between the node units 21 and the terminal units 11 can be easily understood.

When the internal memory 30a stores mapping information for mapping the respective equivalent addresses stored in the address storage section 13 to the addresses stored in the state storage section 22, in one to one correspondence. This leads to that the correspondence relationship between the node units 21 and the terminal units 11 can be easily understood, and the load units can be easily controlled.

When the internal memory 30a stores mapping information for mapping the respective equivalent addresses stored in the address storage section 13 to the addresses stored in the state storage section 22, in one to plural N correspondence. This leads to that a plurality of node units 21 of the contention communication system 2 can be easily batch-controlled by one terminal unit 11 of the polling communication system 1.

When the control section 30 further includes the correspondence selecting switch 16 for setting a plurality of N data in the mapping information. This leads to that a plurality of node units 21 of the contention communication system 2 can be easily batch-controlled by one terminal unit 11 of the polling communication system 1, in one to plural N correspondence.

When the control section 30 further includes the operation selecting switch 17 for selecting one logical operation from OR, AND, NOR, and NAND logical operations to be performed for a plurality of N transmission signals which represent results of operating states of a plurality of N second load units to be controlled and which are received by the second signal processing section 32, and the control section 30 performs the logical operation selected by the operation selecting switch 17 for a plurality of N transmission signals which represents results of operating states of a plurality of N second load units to be controlled and which is received by the second signal processing section 32, and transmits a transmission signal representing the results of the logical operation to the terminal unit 11 mapped to the plurality of N second load units. This allows collective management of predetermined operating states of a plurality of second load units in the polling communication system 1, and it is possible to monitor checking any second load units which the user has forgot to turn off, and to monitor an abnormal state of the second load units. Providing the operation selecting switch 17 for batch-control over the second load units corresponding to this kind of monitoring results allows such a control as collectively turning off the second load units when the user has forgot to turn off the second load units.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The present disclosure relates to the subject matter contained in the priority document of Japanese Patent Application No. P2001-091287, filed on Mar. 27, 2001, entitled "Interface between systems for use in remote control system", which is herein expressly incorporated by reference in its entirety.

What is claimed is:

1. An interface apparatus provided between a first remote control system of a polling communication system and a second remote control system of a contention communication system,
   wherein said first remote control system comprises:
   a plurality of terminal units each having a predetermined address; and
   a transmission unit,
   wherein said plurality of terminal units and said transmission unit are connected with each other via a first signal line,
   wherein said transmission unit is configured to transmit and to receive a transmission signal addressing a first terminal unit and a second terminal unit, respectively, to and from said first terminal unit for receiving a first input signal and to and from said second terminal unit for controlling a first load unit, via said first signal line, by using time division multiplexing access, thereby controlling said first load unit in response to the first input signal;
   wherein said second remote control system comprises a plurality of node units each having a predetermined address, and said node units are connected via a second signal line,
   wherein a first node unit for receiving a second input signal and a second node unit for controlling a second load unit are configured to transmit and receive a transmission signal addressing said first and second node units to and from each other via said second signal line, thereby controlling said second load unit in response to the second input signal, wherein said interface apparatus comprises:

a first signal processing section configured to transmit and receive a transmission signal transmitted via said first signal line;

a second signal processing section configured to transmit and receive a transmission signal transmitted via said second signal line;

an address storage section, used in said first signal processing section, configured to store a plurality of equivalent addresses corresponding to respective addresses of said plurality of terminal units;

a state storage section, used in said second signal processing section, configured to store respective addresses of said plurality of node units and names of the node units corresponding to the respective addresses;

an information storage section configured to store mapping information for mapping the respective equivalent addresses stored in said address storage section to the respective addresses stored in said state storage section so that data is transmitted only in one direction in each pair of the respective equivalent addresses stored in said address storage section and the respective addresses stored in said state storage section; and a control section configured to execute at least one of a process of the following processes based on the mapping information:

a first control processing configured to transmit a transmission signal for controlling said second load unit to said second node unit via said second signal line in response to a transmission signal which represents reception of the first input signal and which is transmitted from said first terminal unit via said first signal line, thereby controlling said second load unit based on the first input signal, and a second control processing configured to transmit a transmission signal for controlling said first load unit to said second terminal unit via said first signal line in response to a transmission signal which represents reception of the second input signal and which is transmitted from said first node unit via said second signal line, thereby controlling said first load unit based on the second input signal, wherein said information storage section is further configured to store mapping information for mapping the respective equivalent addresses stored in said address storage section to the addresses stored in said state storage section, in one to at least one correspondence, wherein in the first control processing, in response to change in a state of said first load unit, said control section transmits a transmission signal for controlling said second load unit with reference to the mapping information stored in said information storage section, to said second mode unit via said second signal line, thereby controlling said second load unit based on the first input signal, and wherein in the second control processing, in response to change in a state of said second load unit, said control section transmits a transmission signal for controlling said first load unit with reference to the mapping information stored in said information storage section, to said second terminal unit via said first signal line, thereby controlling said first load unit based on the second input signal, and wherein said interface apparatus further comprises, a direction selection switch unit comprising a dip switch having sixteen contact points, configured to specify at said sixteen contact points the transmission direction of data in said each pair of the respective equivalent addresses stored in said address storage section and the respective addresses stored in said state storage section.

2. The interface apparatus as claimed in claim 1, wherein said control section is configured to execute both of the first and second control processes.

3. The interface apparatus as claimed in claim 1, wherein said control section is configured to execute only the first control processing.

4. The interface apparatus as claimed in claim 1, wherein said control section is configured to execute only the second control processing.

5. The interface apparatus as claimed in claim 1, wherein said control section further comprises a first switch configured to set a plurality of N data in the mapping information.

6. The interface apparatus according to claim 1, wherein the direction selection switch unit is configured to choose between bi-directional data exchange, data exchange from the polling communication system to the contention communication system, and data exchange from the contention communication system to the polling communication system.

7. The interface apparatus according to claim 1, wherein the data exchange direction can be set by the plural manually selectable switches for each terminal unit or for each node unit individually.

* * * * *

UNITED STATES PATENT AND TRADEMARK OFFICE
CERTIFICATE OF CORRECTION

PATENT NO.         : 7,225,273 B2                                    Page 1 of 1
APPLICATION NO.    : 10/096281
DATED              : May 29, 2007
INVENTOR(S)        : Takeshi Hatemata It is certified that error appears in the above-identified patent and that said Letters Patent is hereby corrected as shown below:

On the title page, Item 73, the Assignee's name is spelled incorrectly. Item 73 should read:

-- (73) Assignee: Matsushita Electric Works, Ltd., Kadoma-shi (JP) --

Signed and Sealed this

Seventh Day of August, 2007

JON W. DUDAS
*Director of the United States Patent and Trademark Office*